Feb. 24, 1959 — DA RUBEN L. BECK — 2,874,814
FREE LOCKING WHEEL HUB
Filed May 1, 1957 — 2 Sheets-Sheet 1

D. L. Beck INVENTOR
BY C. A. Knowles
ATTORNEYS.

Feb. 24, 1959    DA RUBEN L. BECK    2,874,814
FREE LOCKING WHEEL HUB
Filed May 1, 1957    2 Sheets-Sheet 2
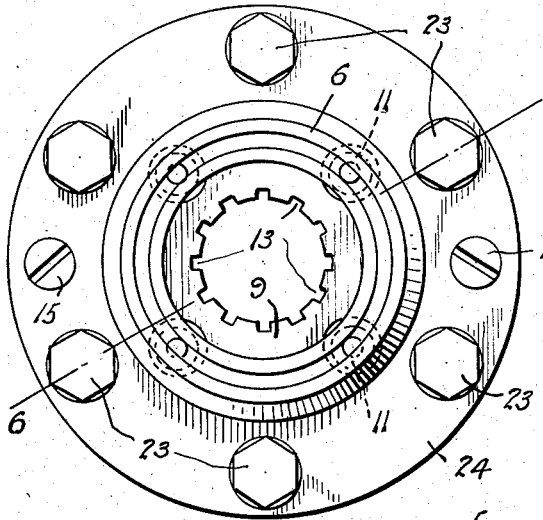
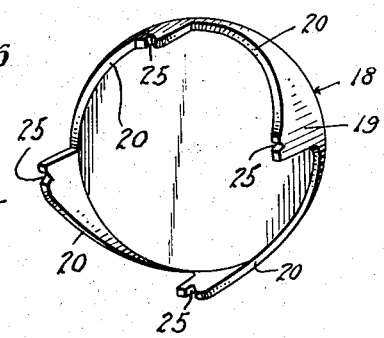
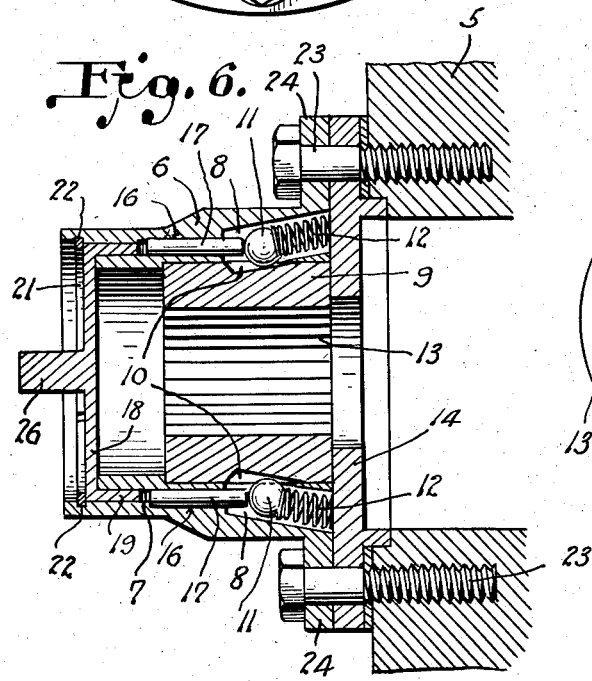
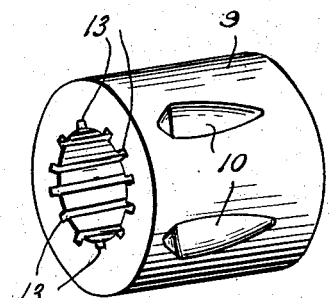
D. L. Beck
INVENTOR
BY  C. A. Snowles
ATTORNEYS.

United States Patent Office 2,874,814
Patented Feb. 24, 1959

2,874,814

FREE LOCKING WHEEL HUB

Da Ruben L. Beck, Middleport, Ohio

Application May 1, 1957, Serial No. 656,266

1 Claim. (Cl. 192—38)

This invention relates to a free wheeling hub assembly designed for use on motor vehicles and is constructed for locking the normal free wheeling front wheel hubs to the power driven front axle of the vehicle for increasing the traction qualities of the vehicle at the will of the operator.

An important object of the invention is to provide a wheel hub of this character which will be positive in its operation and one which will be securely held in either its position locked to its power shaft or free to rotate on the power shaft, as desired.

A further object of the invention is to provide a free wheeled hub assembly which will be exceptionally simple in construction and one which may be readily and easily mounted on a wheel, without the necessity of making alterations in the conventional wheel construction.

With the foregoing and other objects in view which will appear as the description proceeds, the invention consists of certain novel details of construction and combination of parts, hereinafter more fully described and pointed out in the claims, it being understood that changes may be made in the construction and arrangement of parts without departing from the spirit of the invention as claimed.

Referring to the drawings:

Fig. 3 is an end elevational view of the hub with the cam member removed.

Fig. 6 is a sectional view taken on line 6—6 of Fig. 3.

Fig. 7 is a perspective view of the cam member.

Fig. 8 is a perspective view of the locking sleeve or bushing.

Figure 1:
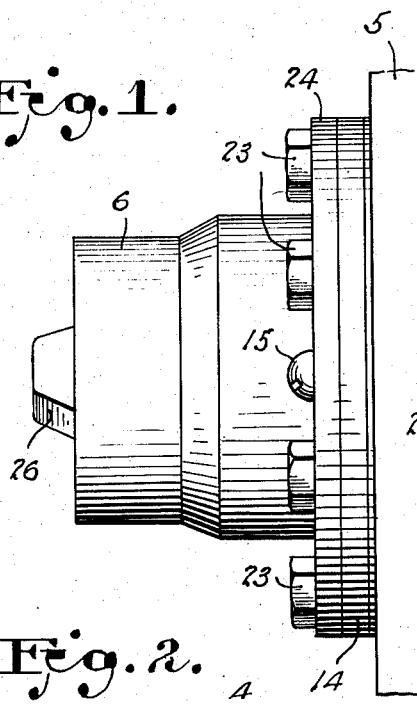
Figure 1 is an elevational view of a free wheeling locking hub, constructed in accordance with the invention.

Referring to the drawings in detail, the reference character 5 indicates the conventional hub of a wheel to which the locking free wheel hub forming the subject matter of the present invention is secured.

Figure 4:
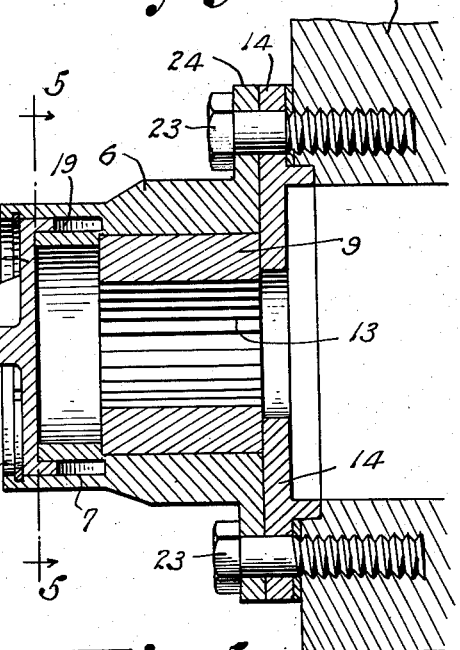
Fig. 4 is a longitudinal sectional view through the wheel hub taken on line 4—4 of Fig. 2.
Figure 2:
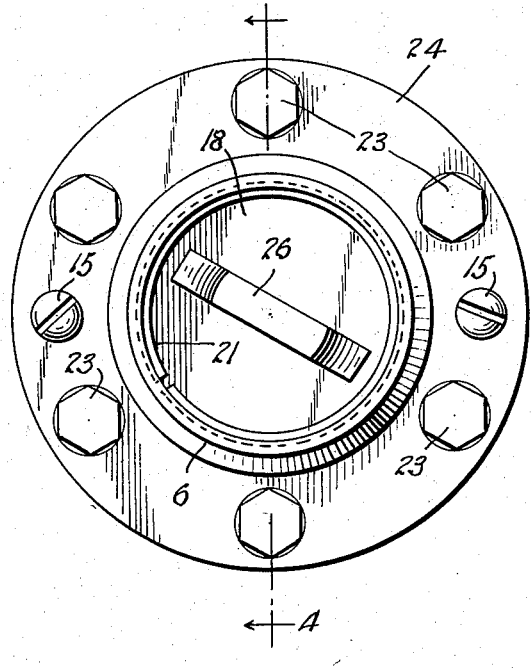
Fig. 2 is a front elevational view thereof.
Figure 5:
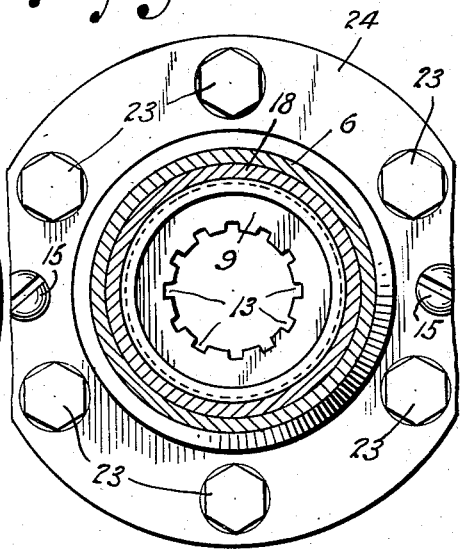
Fig. 5 is a sectional view taken on line 5—5 of Fig. 4.

The hub comprises a body portion 6 which is formed with an annular groove 7 formed adjacent to the outer end thereof, the body portion being hollow and circular, as better shown by Figs. 4 and 6 of the drawings.

Formed in the body 6, are spaced inclined bores 8 that extend from the inner end of the body portion and communicate with the interior of the body portion at their opposite ends.

The reference character 9 indicates an inner bushing which fits within the body portion for rotation therein under certain conditions.

This inner bushing is formed with pockets 10 that are formed in the periphery thereof and arranged in predetermined spaced relation with respect to each other, the pockets being so disposed that they will fall opposite to the inner ends of the bores 8, as better shown by Fig. 6 of the drawings.

Mounted within the bores 8 are balls 11, which are normally urged outwardly by coiled springs 12 that are mounted within the bores, the outer ends of the springs resting against the balls 11 normally urging the balls 11 into the enlarged ends of the pockets 10 to lock body 6 to said inner bushing to rotate with the power axle on which the wheel equipped with the hub is mounted.

In order that the bushing 9 will rotate with the power shaft, spaced grooves 13 are provided within the inner bushing 9, which grooves accommodate the usual ribs of a power shaft to secure the bushing 9 to the power shaft, not shown.

The springs 12 rest against the retainer plate 14 that is held against the inner end of the hub body 6, by means of the screws 15, the retainer plate providing a base or supporting surface for the coiled springs 12.

The body portion 6 is provided with a plurality of bores 16 which establish communication between the pockets 10 and the annular groove 7, the bores 16 being of diameters to receive the pins 17 which have one of their respective ends extended into the bore 8 associated therewith, as shown by Fig. 6.

Mounted within the outer end of the body portion 6, is a cam member 18 which is in the form of a circular cap with an annular flange 19 formed integral therewith, the flange 19 being fitted within the annular groove 7 so that the cam surfaces 20 thereof may contact the pins 17. The cam member 18 is held in position within the open outer end of the hub by means of the split spring ring 21 that is held in an annular groove 22 formed within the inner surface of the hub adjacent to the outer end thereof. Thus, it will be seen that by removing the split spring ring 21 the various elements of the locking free wheeling hub may be removed.

Bolts 23 extend through registering openings in the flange 24 of the body portion 6 and openings in the retainer plate 14, the bolts affording means for securing the locking free wheeling hub to the hub of the wheel with which it is used.

It might be further stated that notches 25 are formed in the surfaces of the high portions of surfaces 20, which notches receive the outer ends of the pins 17, when the pins have been moved inwardly to unseat the balls 11 for free wheeling, thereby securing the cam member against accidental movement.

A finger piece in the form of an enlargement 26 is formed integral with the cam member 18 and affords means for effecting rotation of the cam member to actuate the pins in one direction or in a direction to lock the hub body portion to the bushing and power shaft.

In the operation of the device, when the hub is set for free wheeling, the balls 11 will be moved into the bores 8 by the pins 17 that are forced against the balls 11 by the cam surfaces 20 as cam member 18 is rotated in a clockwise direction disengaging the wheel and bushing 9.

Should it be desired to lock the wheel to its power shaft, the cam member 18 is rotated in the opposite direction, whereupon springs 12 move the balls 11 into the pockets 10 of bushing 9 setting up a wedging action between the body portion 6 and bushing 9 to lock the hub and its wheel to the power shaft.

Having thus described the invention, what is claimed is:

A locking free wheeling hub comprising a hollow body having inclined bores extending inwardly from one end thereof, adapted to be secured on the hub of a free wheel mounted on a drive shaft, a bushing secured to said shaft to rotate therewith, fitted in said body, said bushing having pockets adapted to align with said bores at one of their respective ends, spring-pressed balls disposed within said bores movable to positions wedged between said pockets and bores normally clutching said body and bushing together, a retainer plate secured over one end of said body against which springs of said spring-pressed balls rest, retaining said spring-pressed balls within said bores, pins operating within said body movable longitudinally of said body, said pins engaging said balls, a rotatable cam mechanism mounted within one end of said body, said cam member embodying a cap, an annular flange extending laterally from said cap, cam surfaces formed on the edge of said flange engageable with said pins adapted to move said pins against the balls against the bias of said springs disengaging said balls from wedging positioned in said pockets releasing said body and wheel for rotation around said bushing, and a manually operable handle on the exterior said cap for effecting rotation of said cam member, each cam surface having a notch therein for engaging the head of its associated pin to retain the same in engaged relation with a ball.

References Cited in the file of this patent

UNITED STATES PATENTS

| | | |
|---|---|---|
| 1,147,126 | Smith | July 20, 1915 |
| 1,618,851 | Thunberg et al. | Feb. 22, 1927 |
| 2,788,103 | Requa | Apr. 9, 1957 |